(No Model.) 3 Sheets—Sheet 1.
E. E. GREENE.
CONDUIT FOR ELECTRIC CONDUCTORS.
No. 374,738. Patented Dec. 13, 1887.
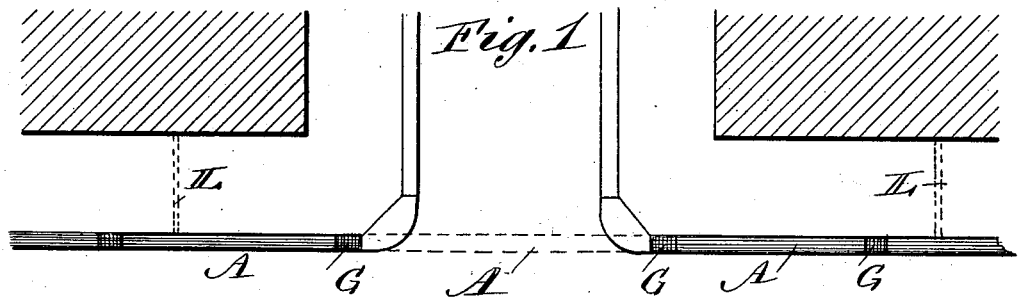
Fig. 1
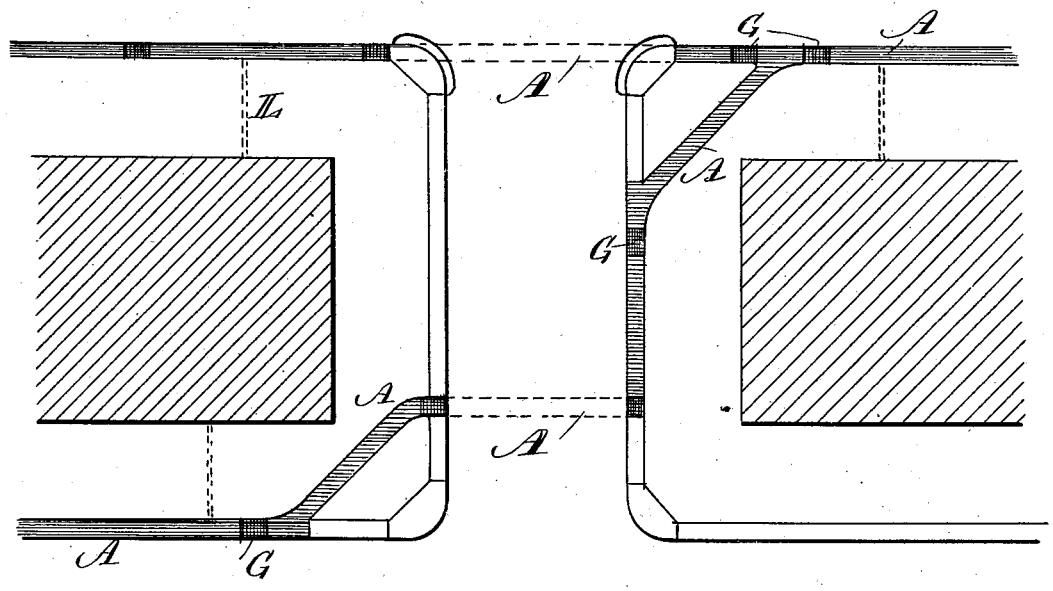
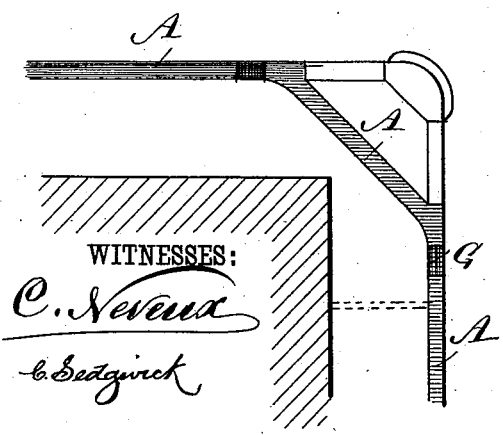
WITNESSES:
C. Neveux
C. Sedgwick
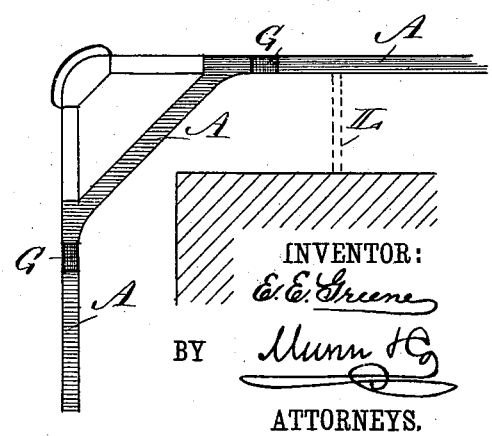
INVENTOR:
E. E. Greene
BY Munn &Co
ATTORNEYS.

(No Model.) 3 Sheets—Sheet 2.

E. E. GREENE.
CONDUIT FOR ELECTRIC CONDUCTORS.

No. 374,738. Patented Dec. 13, 1887.

WITNESSES:
C. Neveux
C. Sedgwick

INVENTOR:
E. E. Greene
BY Munn & Co
ATTORNEYS.

(No Model.) 3 Sheets—Sheet 3.

E. E. GREENE.
CONDUIT FOR ELECTRIC CONDUCTORS.

No. 374,738. Patented Dec. 13, 1887.

WITNESSES:
C. Neveux
C. Sedgwick

INVENTOR:
E. E. Greene
BY Munn & Co
ATTORNEYS.

UNITED STATES PATENT OFFICE.

EDWARD E. GREENE, OF NEW YORK, N. Y.

CONDUIT FOR ELECTRIC CONDUCTORS.

SPECIFICATION forming part of Letters Patent No. 374,738, dated December 13, 1887.

Application filed August 11, 1887. Serial No. 246,677. (No model.)

*To all whom it may concern:*

Be it known that I, EDWARD E. GREENE, of the city, county, and State of New York, have invented a certain new and useful Improvement in Conduits for Electric Conductors, of which the following is a specification.

The object of my improvement is to provide a conduit for electrical conductors which can be cheaply and easily laid, the conductors in which will be at all times convenient of access, and which will afford an extremely convenient means of local distribution.

I will first describe in detail a conduit for electric conductors embodying my improvement, and then point out the various features of the improvement in claims.

Reference is to be had to the accompanying drawings, forming a part of this specification, in which similar letters of reference indicate corresponding parts in all the figures.

Figure 2:
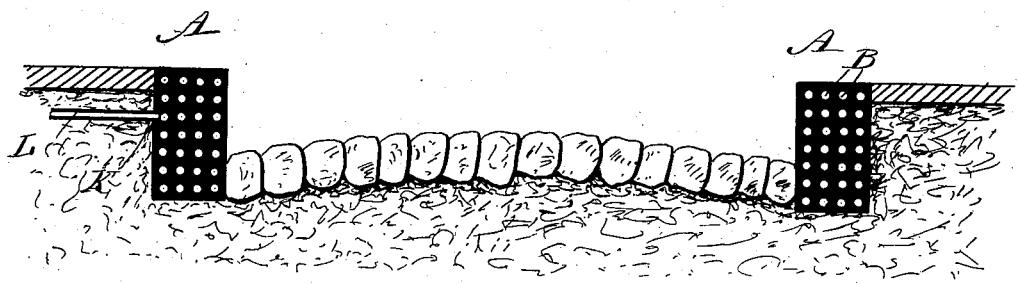
Figure 3:
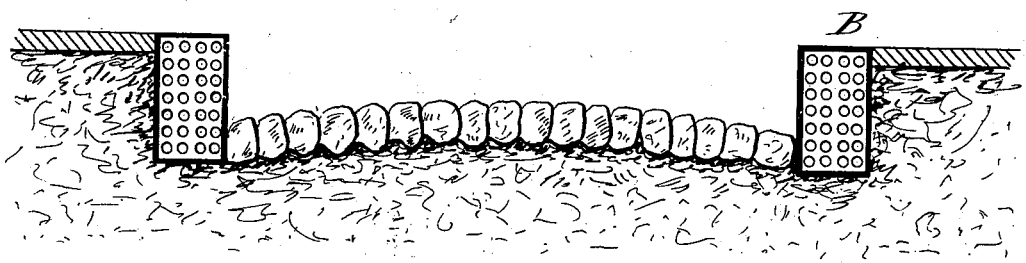
Figure 4:
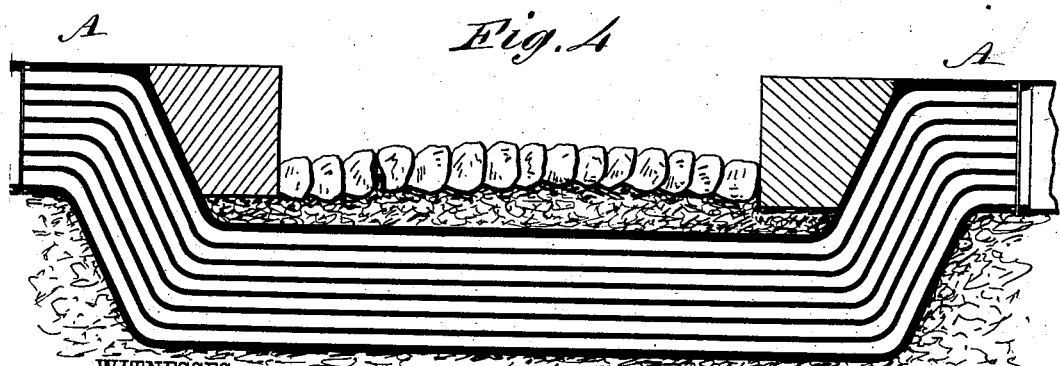
Figure 5:
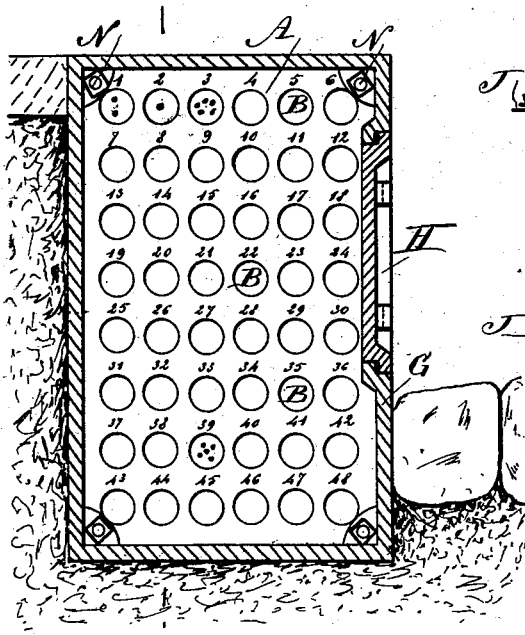
Figure 7:
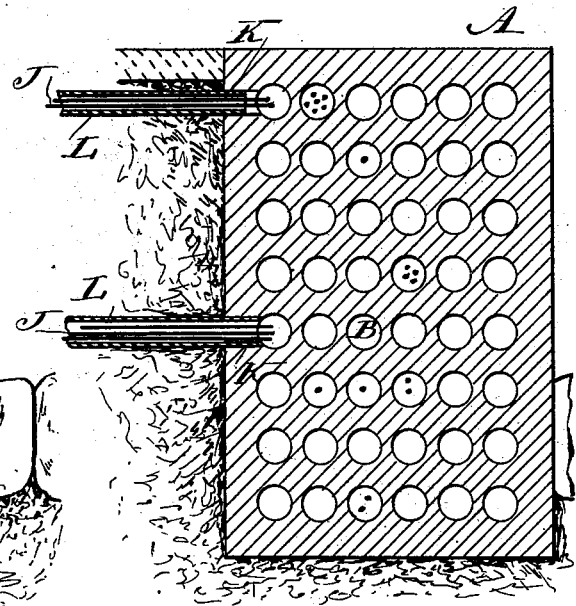
Figure 6:
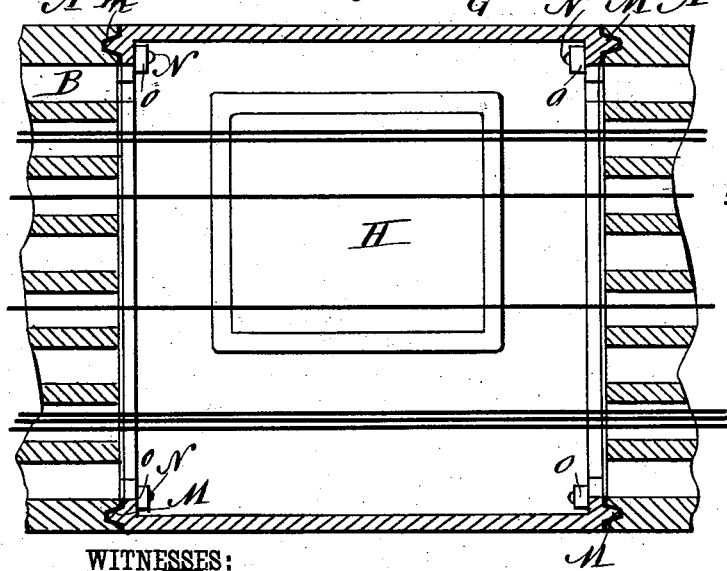
Figure 8:
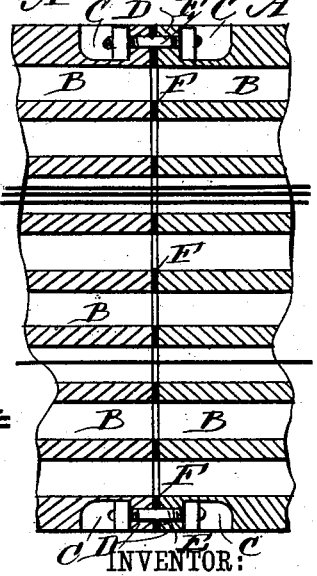

Figure 1 is a plan of a system of electric conduits embodying my improvement. Fig. 2 is a cross-section of a street on either side of which said conduits are laid, and Fig. 3 is a similar cross-section taken through the boxes joining the conduit-sections. Fig. 4 is a cross-section illustrating the manner in which a street is crossed by the conduit. Fig. 5 is an enlarged cross-section of one of the boxes joining the conduit-sections on one side of the street. Fig. 6 is a longitudinal section of the same on the line $x\ x$, Fig. 5. Fig. 7 is a cross-section of the conduit proper. Fig. 8 is a vertical section through the joint uniting two abutting conduit-sections.

The sections A of the conduit are designed to replace and serve as the ordinary curb, and to this end are cast or molded in iron, artificial stone, or other suitable material, of a deep rectangular cross-section corresponding to that of the usual curbstone. Series of ducts B for the conducting-cables extend longitudinally through the sections A, as usual.

The conduit-sections are laid end to end, in lieu of the usual curbstones, directly in the earth, or upon a concrete or kindred solid foundation previously prepared therefor, and their meeting ends connected air and water tight by a joint, as shown in Fig. 8. To form this joint peripheral recesses C are formed around the ends of either section a short distance from the extremities thereof, so as to leave countersunk flanges D, which are drawn tightly together by bolts E, a paper, rubber, or other suitable packing, F, having holes corresponding accurately with the ducts on opposite sides thereof, being preferably interposed between the meeting ends of the sections to more perfectly complete the joint.

At suitable intervals in the length of the conduit hollow connecting-boxes G are interposed between the ends of adjacent sections A, said boxes being preferably of iron, having a cross-section coinciding in outline with that of the conduit-sections A, and open at both ends, as shown clearly in Figs. 5 and 6; or they may have end heads formed with holes registering with the conduit-ducts.

In the front of each box G is arranged, so as to be above the pavement when the conduit is laid, a door, H, by which access can be had at all times to the interior of the box for running the wires or cables through the conduit, as by the usual drawing-in system, for making connections or repairs, or for other purposes.

The doors H, when not in use, are to be hermetically sealed to exclude dust, moisture, &c.

For making connections with buildings and other local stations access is had to the proper main wires, which are, for convenience, run through the inner vertical series of ducts B, by boring or otherwise forming in the inner side of the sections A holes K, leading to the proper ducts, at points opposite the respective stations, and the distributing-wires J can then be readily connected to the main wires. With each lateral distributing-hole K is preferably connected, by a screw or other water-tight joint, a branch conduit-pipe, L, preferably of iron, by which the distributing wire or wires J can be carried to the house or other local station.

The distributing-pipes L will of course run below the sidewalk, and can at any time be readily laid and connected, as described, on removing the necessary flagging and excavating to the required depth.

In some cases the branch conduit-pipes L may be led directly into the boxes G, which latter are of course connected by water-tight joints with the adjoining conduit-sections. This joint may be like that described for uniting meeting sections of the conduit, or like that shown in Fig. 6, where tongues M, extending around either end of the box G, are represented as fitting in grooves formed in the ends of the conduit-sections and bolts N, formed on the ends of the said sections, as being passed through interiorly-projecting lugs or flanges on the ends of the box G to receive nuts O, by which the joints are made tight.

At a street-crossing the conduit is depressed, as shown in Figs. 1 and 4, beneath the said street by means of suitably-offset or bevel-ended conduit-sections.

In turning a corner the conduit may extend by a short cut across the angle, as shown in Fig. 1, or may follow the edge of the sidewalk like the ordinary curb.

Where the conduit or parts thereof are of conducting material, the electric wires carried thereby will of course be insulated, either singly or in the form of a cable.

Having thus described my invention, what I claim as new, and desire to secure by Letters Patent, is—

1. In a curbstone-conduit, the combination of two sections, A, having ducts B and end peripheral recesses, C, forming countersunk flanges D, and joining-bolts E, substantially as shown and described.

2. In a curbstone-conduit, the combination of sections A, having ducts B and projecting end bolts, N, hollow boxes G, having interiorly-projecting end flanges through which the bolts N are passed, and nuts O, substantially as shown and described.

3. In a curbstone-conduit, a metal box, G, cast hollow—i. e., without ducts—open at the ends, having a cross-section conforming in contour to that of a curbstone, and formed with tongues M, projecting longitudinally from and extending around each end, with connection-flanges projecting inward from the side walls at each end, and with a side opening, H, as and for the purpose set forth.

4. In a curbstone-conduit, a conduit-section, A, formed with ducts B and with end peripheral recesses, C, forming countersunk outward and laterally projecting end flanges, D, as and for the purpose set forth.

EDWARD E. GREENE.

Witnesses:
 CLARENCE L. BURGER,
 C. SEDGWICK.